(12) United States Patent
Yoon et al.

(10) Patent No.: US 11,976,218 B2
(45) Date of Patent: May 7, 2024

(54) CATHODE AND METHOD OF MANUFACTURING THE SAME

(71) Applicant: LG Chem, Ltd., Seoul (KR)

(72) Inventors: Jeong Ae Yoon, Daejeon (KR); Han Na Chi, Daejeon (KR); Sung Soo Yoon, Daejeon (KR); Su Jee Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 259 days.

(21) Appl. No.: 15/316,925

(22) PCT Filed: Jul. 9, 2015

(86) PCT No.: PCT/KR2015/007125
§ 371 (c)(1),
(2) Date: Dec. 7, 2016

(87) PCT Pub. No.: WO2016/006945
PCT Pub. Date: Jan. 14, 2016

(65) Prior Publication Data
US 2017/0110733 A1    Apr. 20, 2017

(30) Foreign Application Priority Data

| | | |
|---|---|---|
| Jul. 11, 2014 | (KR) | 10-2014-0087364 |
| Nov. 6, 2014 | (KR) | 10-2014-0153838 |
| Nov. 6, 2014 | (KR) | 10-2014-0153839 |

(51) Int. Cl.

| | |
|---|---|
| *C09D 7/61* | (2018.01) |
| *C09D 5/24* | (2006.01) |
| *C09D 133/20* | (2006.01) |
| *C09D 133/24* | (2006.01) |
| *H01M 4/02* | (2006.01) |
| *H01M 4/04* | (2006.01) |
| *H01M 4/13* | (2010.01) |
| *H01M 4/131* | (2010.01) |
| *H01M 4/139* | (2010.01) |
| *H01M 4/1391* | (2010.01) |
| *H01M 4/485* | (2010.01) |
| *H01M 4/505* | (2010.01) |
| *H01M 4/525* | (2010.01) |
| *H01M 4/62* | (2006.01) |
| *H01M 4/66* | (2006.01) |
| *H01M 10/0567* | (2010.01) |

(52) U.S. Cl.
CPC ............ *C09D 7/61* (2018.01); *C09D 5/24* (2013.01); *C09D 133/20* (2013.01); *C09D 133/24* (2013.01); *H01M 4/0404* (2013.01); *H01M 4/13* (2013.01); *H01M 4/131* (2013.01); *H01M 4/139* (2013.01); *H01M 4/1391* (2013.01); *H01M 4/485* (2013.01); *H01M 4/505* (2013.01); *H01M 4/525* (2013.01); *H01M 4/62* (2013.01); *H01M 4/622* (2013.01); *H01M 4/661* (2013.01); *H01M 10/0567* (2013.01); *H01M 2004/028* (2013.01)

(58) Field of Classification Search
CPC ...... H01M 4/622; H01M 4/131; H01M 4/525; H01M 4/1391; H01M 4/661; H01M 4/505; H01M 4/485; H01M 4/0404; H01M 2004/028; C09D 133/20; C09D 133/24; C09D 5/24; C09D 7/1216
See application file for complete search history.

(56) References Cited

U.S. PATENT DOCUMENTS

| | | | |
|---|---|---|---|
| 5,595,841 A | 1/1997 | Suzuki | |
| 2002/0034686 A1* | 3/2002 | Yamakawa | H01M 4/621 429/217 |
| 2006/0275661 A1 | 12/2006 | Kim et al. | |
| 2009/0053603 A1* | 2/2009 | Hoshiba | H01M 4/622 429/217 |
| 2009/0117465 A1 | 5/2009 | Tokunaga et al. | |
| 2010/0055564 A1 | 3/2010 | Tokunaga et al. | |
| 2012/0183848 A1 | 7/2012 | Kang et al. | |
| 2013/0202963 A1 | 8/2013 | Kim et al. | |
| 2013/0280570 A1* | 10/2013 | Kim | C09J 7/245 429/246 |
| 2014/0154570 A1 | 6/2014 | Kan | |
| 2014/0205904 A1* | 7/2014 | Sasaki | H01M 4/622 429/217 |

FOREIGN PATENT DOCUMENTS

| | | |
|---|---|---|
| JP | H08287915 A | 11/1996 |
| JP | 200021408 A | 1/2000 |
| JP | 2000123838 A | 4/2000 |
| JP | 2008123824 A | 5/2008 |

(Continued)

OTHER PUBLICATIONS

Machine Translation and Abstract in English of KR 10-2013-0135092. (Year: 2013).*
International Search Report from PCT/KR2015/007125, dated Sep. 2, 2015.
Extended European Search Report for Application No. EP15819055.3 dated Nov. 9, 2017.

*Primary Examiner* — Brian R Ohara
*Assistant Examiner* — Michelle T Leonard
(74) *Attorney, Agent, or Firm* — Lerner David LLP

(57) ABSTRACT

The present application relates to a cathode, a method of manufacturing the same, and a battery including the same. The present application may provide a cathode and a method of manufacturing the same, wherein the cathode comprises an active material layer that contains an acrylic polymer and exhibits excellent resistance to an electrolyte, excellent dispersion of its components and great adhesion to a current collector.

14 Claims, No Drawings

(56) References Cited

FOREIGN PATENT DOCUMENTS

| | | | |
|---|---|---|---|
| JP | 2008546135 A | 12/2008 | |
| JP | 2010097816 A | 4/2010 | |
| JP | 2011076916 A | 4/2011 | |
| JP | 2011134649 A | 7/2011 | |
| JP | 2013004407 A | 1/2013 | |
| JP | 2013045010 A | 3/2013 | |
| JP | 201369555 A | 4/2013 | |
| JP | 2013093297 A | 5/2013 | |
| JP | 2013152955 A | 8/2013 | |
| JP | 2013206759 A | 10/2013 | |
| KR | 100560533 B1 | 3/2006 | |
| KR | 20090046700 A | 5/2009 | |
| KR | 10-2013-0135092 | * 12/2013 | |
| KR | 20130135092 A | 12/2013 | |
| WO | 2010098380 A1 | 9/2010 | |
| WO | 2012043812 A1 | 4/2012 | |
| WO | WO-2013031690 A1 * | 3/2013 | ............ H01M 4/622 |
| WO | 2015098507 A1 | 2/2015 | |

* cited by examiner

CATHODE AND METHOD OF MANUFACTURING THE SAME

CROSS-REFERENCE TO RELATED APPLICATION

The present application is a national phase entry under 35 U.S.C. § 371 of International Application No. PCT/KR2015/007125 filed on Jul. 9, 2015, which claims priority to and the benefit of Korean Patent Application No. 10-2014-0087364, filed on Jul. 11, 2014, Korean Patent Application No. 10-2014-0153838, filed on Nov. 6, 2014, and Korean Patent Application No. 10-2014-0153839, filed on Nov. 6, 2014, the disclosures of which are incorporated herein by reference in their entirety.

BACKGROUND

1. Field of the Invention

The present application relates to a cathode which comprises an active material layer containing an acrylic polymer and a method of manufacturing the same.

2. Discussion of Related Art

A cathode may be prepared, for example, by preparing a slurry-like paste with a cathode active material, a conductive material and a binder for dispersion, coating a current collector with the paste, which is then dried, rolled, and additionally dried.

Meanwhile, there has been a demand for development of a secondary battery with higher energy density and higher energy output as the field of application of secondary batteries broadens to cover electric vehicles, and the like. Accordingly, there have been attempts made to improve energy density and energy output of the battery by decreasing the content of a binder and increasing the content of active materials, and therefore, the binder's ability to uniformly disperse active materials and a conductive material has become emphasized.

Also, binders even when used in a small amount, are required to be capable of enabling the active material layer to maintain sufficient adhesion to a current collector, because if sufficient adhesion to the current collector is not guaranteed, the active material layer tends to suffer swelling in an electrolyte after a long-term cycle life, which leads to a decrease in the performance of the battery. As a binder material for dispersion, electrochemically highly stable polyvinylidene difluoride (PVDF) is generally used, however the conventionally used PVDF binder shows limited adhesive strength when used in a reduced amount due to its semicrystalline character.

CITATION LIST

Patent Literature

[Patent Literature 1]
Japanese Unexamined Patent Application Publication No. 2013-152955
[Patent Literature 2]
Japanese Unexamined Patent Application Publication No. 2011-076916

SUMMARY OF THE INVENTION

The present application provides a cathode, a method of manufacturing the same, and a battery.

The present application may relate to a cathode comprising an active material layer present on a current collector. The above-described active material layer may contain an acrylic polymer, and the acrylic polymer forms a cross-linked structure with a polyfunctional cross-linker.

Also, the peel strength of the active material layer to the current collector may be 20 gf or more when measured at a peeling speed of 0.3 m/min and a peeling angle of 180 degrees at room temperature with an electrode specimen sized at 15×150 mm$^2$.

In one example, an acrylic polymer may comprise a polymerization unit of a (meth)acrylic acid ester compound and a polymerization unit of monomer having a cross-linkable group. Also the acrylic polymer may further comprise a polymerization unit of a monomer having a nitrogen-containing functional group or a polymerization unit of a monomer having an alkoxysilane group.

In one example, the acrylic polymer may have a particle diameter of 10 nm or less.

Also, the present application may relate to a method of manufacturing a cathode, where the method comprises cross-linking of an acrylic polymer in a state in which a composition layer for an active material layer containing the acrylic polymer is previously formed on a current collector.

In one example, the acrylic polymer may be a polymer prepared through solution polymerization using a mixture of a (meth)acrylic acid ester compound, a monomer having a cross-linkable functional group, and a solvent. Also the mixture may further comprise either a monomer containing a functional group having nitrogen or a monomer containing an alkoxysilane group.

Further, the present application may relate to a secondary battery comprising the above-described cathode.

The present application may provide a cathode comprising an active material layer which exhibits excellent adhesive strength to a current collector and excellent resistance to an electrolyte, a method of manufacturing the same, and a battery.

DETAILED DESCRIPTION OF EXEMPLARY EMBODIMENTS

Hereinafter, the present application will be described in further detail through its exemplary embodiments, but the descriptions are only exemplary embodiments defined by the gist of the present application. Also, the present application is not limited by operation conditions provided hereinafter in its exemplary embodiments, and it is apparent to those skilled in the art that some conditions may be suitably selected within the range required to accomplish the purposes of the present application.

A cathode of the present application may comprise a current collector and an active material layer that is formed on the current collector and comprises an acrylic polymer forming a cross-linked structure by a polyfunctional cross-linker. The active material layer exhibits excellent adhesion to the current collector and effectively holds an active material such as a conductive material, and so on.

The cathode of the present application may be prepared as described hereinafter, for example, by cross-linking an acrylic polymer in a state in which a composition for an active material layer containing the acrylic polymer is applied onto a current collector. Since the active materials constituting an active material layer are applied onto the current collector prior to the cross-linking as mentioned above, the resulting active material layer has strong adhesion to the current collector and high resistance to an electrolyte.

In the cathode of the present application, the active material layer may have a peel strength to the current collector of 20 gf or more, preferably, 30 gf or more, 40 gf or more, 50 gf or more, 60 gf or more, 70 gf or more, or 80 gf or more, where the peel strength is measured at a peeling speed of 0.3 m/min and a peeling angle of 180 degrees at room temperature with an electrode specimen sized at 15×150 mm².

In the present application, the term "room temperature" may refer to a temperature in its natural state without being elevated or lowered, and may refer to temperatures in the range of approximately 10° C. to 30° C., or in the range of approximately 23° C. to 25° C.

In the present application, the term "acrylic polymer" used herein refers to a polymer that comprises a polymerization unit of an acrylic monomer at 30 wt % or greater.

Specifically, an acrylic polymer may refer to a polymer that comprises a polymerization unit of an acrylic monomer in an amount within the above-described range and may further comprise a polymerization unit of a monomer having a cross-linkable functional group and/or other polymerization units of co-monomers described hereinafter.

The acrylic monomer mentioned above may refer to a (meth)acrylic acid or a derivative thereof. Also in the present application, the term "(meth)acrylic acid" may refer to a methacrylic acid or an acrylic acid, whereas the term "(meth)acrylate" may refer to a methacrylate or an acrylate.

The acrylic polymer of the present application may have a glass transition temperature ranging, for example, from −80° C. to 50° C. If the glass transition temperature falls within this range, adhesion to a current collector, ability to hold a material such as a conductive material and resistance to an electrolyte can be secured in a beneficial way.

The acrylic polymer of the present application may have a weight average molecular weight in the range of 5,000 to 1,000,000. The term "weight average molecular weight" refers to a value measured in gel permeation chromatography (GPC) with a polystyrene standard calibration, and unless defined otherwise, a molecular weight of a particular polymer may refer to a weight average molecular weight of the polymer.

The acrylic polymer of the present application may comprise, for example, a polymerization unit of a (meth)acrylic acid ester compound (A) and a polymerization unit of a monomer having a cross-linkable group (B).

In the present application, the term "a polymerization unit of a compound" may refer to the polymerized state of the polymerization unit on a skeleton, backbone and/or side chain of the polymer which is formed by polymerization of those polymerization units.

The (meth)acrylic acid ester compound is not limited to a particular species, and may be selected, for example, to have a glass transition temperature within the above-described range. Conventionally, an alkyl (meth)acrylate may be used as the (meth)acrylic acid ester compound.

In one example, an alkyl (meth)acrylate may be an alkyl (meth)acrylate containing an alkyl group having 1 to 20 carbon atoms, examples of such alkyl (meth)acrylates include, but are not limited to, methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, 2-ethylhexyl (meth)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth)acrylate, octadecyl (meth)acrylate and isobornyl (meth)acrylate.

A monomer having the above-mentioned cross-linkable functional group may be selected without particular restriction so long as it can be polymerized with other compounds that form an acrylic polymer, and provide the acrylic polymer with the cross-linkable group.

The cross-linkable functional group may be selected without restriction, as long as it can cause a cross-linking reaction in the temperature range of 50° C. to 300° C. with a polyfunctional cross-linker which will be discussed hereinafter.

In one example, a cross-linkable functional group of a monomer containing a cross-linkable functional group may be a hydroxyl group, an isocyanate group, a glycidyl group, an epoxy group, an amine group, or a carboxyl group, and so on.

A variety of monomers containing the cross-linkable functional group that may be used to form an acrylic polymer are widely known. In the present application, a suitable type may be selected among these monomers in consideration of a target glass transition temperature or reactivity with a cross-linker. Such cross-linker will be discussed hereinafter.

For example, a monomer containing a hydroxyl group may comprise, but is not limited to: a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate, and 8-hydroxy-octyl (meth)acrylate; or a hydroxyl polyalkylene glycol (meth)acrylate such as hydroxyl polyethylene glycol (meth)acrylate and hydroxypolypropylene glycol (meth)acrylate.

Also, a monomer containing a carboxyl group may comprise, but is not limited to: (meth)acrylic acid, 2-(meth)acryloyloxy acetic acid, 3-(meth)acryloyloxy propionic acid, 4-(meth)acryloyloxy butyric acid, an acrylic acid dimer, itaconic acid, maleic acid, or maleic anhydride.

Examples of a monomer containing an amine group may comprise, but are not limited to: 2-aminoethyl (meth)acrylate, 3-aminopropyl (meth)acrylate, N,N-dimethylaminoethyl (meth)acrylate, and N,N-dimethylaminopropyl (meth)acrylate.

There are no particular limitations in the content ratio of the polymerization unit of the (meth)acrylic acid ester compound (A) and the polymerization unit of the monomer repeat unit having a cross-linkable group (B) in the acrylic polymer thus, their content ratio may be determined in consideration of the glass transition temperature and cross-linking efficiency of the polymer. In one example, the acrylic polymer may comprise the polymerization unit of the (meth)acrylic acid ester compound in an amount of 30 to 95 parts by weight and the monomers having a cross-linkable group in an amount of 0.1 to 30 parts by weight.

The acrylic polymer may further comprise an optional co-monomer polymerization unit (C) so as to ensure excellence and sufficiency in the properties such as a glass transition temperature, cross-linking efficiency, resistance to an electrolyte, and adhesive strength to a current collector. There is no particular limitation in the type and amount of such co-monomer for use, and thus can be suitably selected from the species disclosed herein.

Examples of the optional co-monomer may comprise, but are not limited to, a monomer having a nitrogen-containing group, a monomer having an alkoxysilane group, or a monomer having an alkylene oxide group.

In particular, monomers having a nitrogen-containing functional group may comprise, for example, an amine group, an imine group, an amide group, a nitro group, an azo group, an imide group, or an azide group.

Examples of the monomer having a nitrogen-containing functional group may comprise, but are not limited to, 2-aminoethyl (meth)acrylate, 3-aminopropyl (meth)acrylate, N,N-dimethylaminoethyl (meth)acrylate and N,N-dimethyl aminopropyl (meth)acrylate.

Examples of the monomer having an amide functional group may comprise, but are not limited to, N,N-dimethyl (meth)acrylamide, N-butoxy methyl (meth)acrylamide, N-methyl (meth)acrylamide, N-vinyl pyrrolidone and N-vinyl caprolactam.

However, the monomers having a nitrogen-containing group mentioned herein do not comprise a (meth)acrylonitrile, which is an example of the optional comonomers described hereinafter. For example, nitrogen-containing functional groups mentioned herein should be understood to exclude a nitrile group.

Specifically, a monomer having an alkoxy silane group may be vinyl alkoxysilane, an allyl alkoxysilane, a (meth) acryloxy alkyl alkoxysilane and a vinyl acryloxy silane. Also, examples of the (meth)acryloxy alkyl alkoxysilane may comprise, but are not limited to, 3-(meth)acryloxypropyl methyldimethoxysilane, 3-(meth)acryloxypropyl methyldiethoxysilane, 3-(meth)acryloxypropyl trimethoxysilane, 3-(meth)acryloxypropyl triethoxysilane, (meth)acryloxymethyl triethoxysilane and (meth)acryloxymethyl tris(trimethylsiloxy)silane.

Specifically, examples of a monomer having an alkylene oxide group may be alkoxy alkylene glycol (meth)acrylic acid ester, alkoxy dialkylene glycol (meth)acrylic acid ester, and alkoxy polyethylene glycol (meth)acrylic acid ester.

Particularly, an acrylic polymer of the present application may have a monomer polymerization unit having a nitrogen-containing functional group or a monomer polymerization unit having an alkoxysilane group among the said co-monomer. The acrylic polymer that comprises a monomer polymerization unit having a nitrogen-containing functional group or a monomer polymerization unit having an alkoxysilane group, may have a high gel content and low swelling index, hence the active material layer which contains the acrylic polymer such as above can have high resistance to an electrolyte, and great peel strength to a current collector.

In one example, wherein an acrylic polymer comprises monomer polymerization units having a nitrogen-containing functional group or an alkoxysilane group, the gel content of the acrylic polymer may be within but is not limited to, the range of 80% to 100%, or 85% to 95%. The gel content of an acrylic polymer comprising a nitrogen-containing functional group is a reference parameter that allows determining the resistance of the acrylic polymer comprising monomer polymerization units having a nitrogen-containing functional group or an alkoxysilane group to an electrolyte as a function of the degree of cross-linking. Accordingly, the resistance to an electrolyte can be calculated from the difference in weights before and after immersion in an electrolyte and drying of a test specimen, wherein the test specimen contains a polyfunctional cross-linker in an amount of 1 to 3 parts by weight with respect to 100 parts by weight of the acrylic polymer of the present application or to 100 parts by weight of the acrylic polymer described above.

Also, the swelling index of an acrylic polymer comprising monomer polymerization units having a nitrogen-containing functional group or an alkoxysilane group, may be for example, in the range of 1.0 to 10.0, or in the range of 1.0 to 7.0. As mentioned above, the swelling index is a parameter for determining the degree of swelling of an acrylic polymer in an electrolyte, and it may be determined by calculating the ratio of the weight of the cross-linked acrylic polymer after swelling in the electrolyte and drying to the initial weight (before swelling) of the same polymer.

Also, the optional co-monomer may be a vinyl monomer other than a (meth)acrylic acid ester compound. That is, the acrylic polymer of the present application may comprise a vinyl-based monomer polymerization unit other than a (meth)acrylic acid ester compound. There is no particular limitation in the type and content ratio of such co-monomer to be included, and can be selected among the species well-known in the art.

Examples of the vinyl monomers other than (meth)acrylic acid ester compounds may comprise, but are not limited to, a (meth)acrylonitrile, or styrene-based monomers such as styrene and methylstyrene.

The optional co-monomer polymerization units C may be comprised in an acrylic polymer at a ratio of 0 to 70 parts by weight, or of 0.1 to 50 parts by weight, or of 0.1 to 40 parts by weight, or of 0.1 or 30 parts by weight, or of 0.1 to 20 parts by weight.

In one example, in the case where an acrylic polymer comprises monomer polymerization units containing a nitrogen-containing functional group or monomer polymerization units containing an alkoxysilane group at a ratio of 0.1 to 20 parts by weight, it is possible for the acrylic polymer to achieve high resistance to an electrolyte and great peel strength to a current collector.

An acrylic polymer in the present application may be prepared by various methods. For example, the acrylic polymer may be prepared by polymerizing a mixture of the selected monomers at desired ratios by solution polymerization, bulk polymerization, suspension polymerization or emulsion polymerization, but solution polymerization is more preferable and may have advantages over the other methods. There is no particular limitation as to the process of the preparation of the polymer by solution polymerization.

In one example, wherein an acrylic polymer is prepared by solution polymerization, one may adjust the particle diameter of the acrylic polymer to 10 nm or less, thereby improving peel strength of the active material layer to the current collector.

Accordingly, the particle diameter of the acrylic polymer according to the present application may be 10 nm or smaller in size. Generally, the particle diameters of acrylic polymers prepared by emulsion polymerization are several hundred nanometers, for example, ranging from 100 nm to 900 nm. When such acrylic polymers are incorporated into an active material layer, the active material layer may exhibit lower peel strength to the current collector, compared to an active material layer comprising acrylic polymers with particle diameters of 10 nm or smaller and prepared by solution polymerization.

The particle diameter of the acrylic polymer may be measured, for example, with a dynamic light scattering (DLS) device.

An active material layer in the present application may comprise an acrylic polymer and a polyfunctional cross-linker, and the polyfunctional cross-linker may be involved in cross-linking the acrylic polymer within the active material layer.

The term "polyfunctional cross-linker" used in the present application may refer to a polyfunctional compound having two or more functional groups per molecule, for example, a polyfunctional compound having two to six functional groups per molecule wherein the functional groups are capable of reacting with a functional group of the acrylic polymer. The functional groups in the polyfunctional compound may be either identical to or different from one another.

The polyfunctional cross-linker of the present application is capable of reacting with the cross-linkable functional groups of the acrylic polymer, and may be a compound having one or more, for example, one to two functional groups selected from the group consisting of alkoxysilane, carboxyl, acid anhydride, vinyl ether, amine, carbonyl, isocyanate, epoxy, aziridinyl, carbodiimide and oxazoline groups.

That is, the polyfunctional cross-linker provided in the present application is a polyfunctional compound having at least two functional groups, wherein at least one of the functional groups is selected from the group consisting of alkoxysilane, carboxyl, acid anhydride, vinyl ether, amine, carbonyl, isocyanate, epoxy, aziridinyl, carbodiimide and oxazoline groups. Also the polyfunctional compound described above may be used in a cathode for a secondary battery.

In one example, a polyfunctional cross-linker having a carboxyl group may be, for example, an aromatic dicarboxylic acid such as o-phthalic acid, isophthalic acid, terephthalic acid, 1,4-dimethyl-terephthalic acid, 1,3-dimethyl-isophthalic acid, 5-sulfo-1, 3-dimethyl-isophthalic acid, 4,4-biphenyl dicarboxylic acid, 1,4-naphthalene dicarboxylic acid, 2,6-naphthalene dicarboxylic acid, norbornene dicarboxylic acid, diphenylmethane-4,4'-dicarboxylic acid, and phenyl indane dicarboxylic acid; an aromatic dicarboxylic acid anhydride such as phthalic anhydride, 1,8-naphthalenedicarboxylic acid anhydride and 2,3-naphthalene dicarboxylic acid anhydride; an alicyclic dicarboxylic acid such as hexahydrophthalic acid; an alicyclic dicarboxylic acid anhydride such as hexahydrophthalic anhydride, 3-methyl-hexahydrophthalic anhydride, 4-methyl-hexahydrophthalic anhydride and 1,2-cyclohexane dicarboxylic acid anhydride; an aliphatic dicarboxylic acid such as oxalic acid, malonic acid, succinic acid, adipic acid, sebacic acid, azelaic acid, suberic acid, maleic acid, chloromaleic acid, fumaric acid, dodecanedioic acid, pimelic acid, citraconic acid, glutaric acid, itaconic acid, and so on.

In one example, a polyfunctional cross-linker having an acid anhydride group may be, for example, pyromellitic anhydride, benzophenone tetracarboxylic acid dianhydride, biphenyltetracarboxylic acid dianhydride, oxydiphthalic acid dianhydride, diphenyl sulfone tetracarboxylic acid dianhydride, diphenyl sulfide tetracarboxylic dianhydride, butane tetracarboxylic dianhydride, perylene tetracarboxylic acid dianhydride, or naphthalene tetracarboxylic acid anhydride, and so on.

In one example, a polyfunctional cross-linker having a vinyl ether group may be, for example, ethylene glycol divinyl ether, diethylene glycol divinyl ether, triethylene glycol divinyl ether, tetraethylene glycol divinyl ether, pentaerythritol divinyl ether, propylene glycol divinyl ether, dipropylene glycol divinyl ether, tripropylene glycol divinyl ether, neopentyl glycol divinyl ether, 1,4-butanediol divinyl ether, 1,6-hexanediol divinyl ether, glycerol divinyl ether, trimethylolpropane divinyl ether, 1,4-dihydroxy-cyclohexane divinyl ether, 1,4-dihydroxymethyl cyclohexane divinyl ether, ethylene oxide-modified hydroquinone divinyl ether, ethylene oxide-modified resorcinol-divinyl ether, ethylene oxide-modified bisphenol A divinyl ether, ethylene oxide-modified bisphenol S divinyl ether, glycerol trivinyl ether, sorbitol tetravinyl ether, trimethylolpropane trivinyl ether, pentaerythritol trivinyl ether, pentaerythritol tetravinyl ether, dipentaerythritol hexavinyl ether, dipentaerythritol polyvinyl ether, ditrimethylolpropane tetravinyl ether or ditrimethylolpropane polyvinyl ether, and so on.

In one example, a polyfunctional cross-linker having an amine group may be, for example, aliphatic diamines such as ethylene diamine and hexamethylene diamine; cycloaliphatic diamines such as 4,4'-diamino-3,3'-dimethyl dicyclohexylmethane, 4,4'-diamino-3,3'-dimethyl dicyclohexyl, diaminocyclohexane and isophorone cycloaliphatic diamines; or aromatic diamines such as xylene diamine.

In one example, a polyfunctional cross-linker having an isocyanate group may be, for example, aromatic polyisocyanates such as 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl ether diisocyanate, 4,4',4"-triphenylmethane triisocyanate and xylylene diisocyanate; aliphatic polyisocyanates such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate and 2,4,4-tetramethyl hexamethylene diisocyanate; aromatic polyisocyanates such as $\omega,\omega'$-diisocyanate-1,3-dimethylbenzene, $\omega,\omega'$-diisocyanate-1,4-dimethylbenzene, $\omega,\omega'$-diisocyanate-1,4-diethylbenzene, 1,4-tetramethyl xylylene diisocyanate, tetramethyl xylene diisocyanate; alicyclic polyisocyanates such as 3-isocyanate methyl-3,5,5-trimethyl cyclohexyl diisocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis (cyclohexyl isocyanate) and 1,4-bis (isocyanatomethyl) or a reaction product of at least one polyisocyanate described above and a polyol.

The specific type of polyfunctional cross-linker to be used in the present application may depend on the type of cross-linkable functional group in the acrylic polymer. For example, in the case where a glycidyl group is the cross-linkable functional group, a polyfunctional cross-linker having a carboxyl, acid anhydride, vinyl ether or amine group may be selected as the suitable polyfunctional cross-linker. In the case where a hydroxyl group is the cross-linkable functional group, a polyfunctional cross-linker having an isocyanate group, among others, may be selected as the suitable polyfunctional cross-linker, and in the case where a carboxyl group is the cross-linkable functional group, a polyfunctional cross-linker having a glycidyl, aziridinyl, carbodiimide or oxazoline group may be selected as the suitable polyfunctional cross-linker.

In other example, the type of polyfunctional cross-linker may be changed in case that the acrylic polymer may comprise a monomer polymerization units having alkoxysilane group. Specifically, if the cross-linkable group is alkoxysilane comprised in the monomer polymerization unit having alkoxysilane, the suitable polyfunctional cross-linker may be a polyfunctional cross-linker having an alkoxysilane group. If the cross-linkable group is a glycidyl group, polyfunctional cross-linkers having a carboxyl, an acid anhydride, a vinyl ether or an amine group may be considered suitable. If the cross-linkable group is a hydroxyl group, a polyfunctional cross-linker having an isocyanate group may be considered suitable.

The polyfunctional cross-linker may be comprised in an amount of 0.1 to 20 parts by weight with respect to 100 parts by weight of the acrylic polymer. When the polyfunctional cross-linker content falls within this range, the active material layer may exhibit sufficient peel strength, high ability to hold the components such as active materials, and it may also be capable of maintaining other advantageous effects.

The cathode active material layer may further comprise components other than those described above. Examples of such components comprise a conductive material and a cathode active material. According to the present application, a cathode active material layer may contain a relatively high portion of the conductive and the cathode active materials but at the same time is capable of maintaining great peel strength to the current collector, leading to higher energy density, higher output density and longer cycle life of the battery.

The cathode active material and conductive material may be selected among the materials well-known in the art.

In one example, examples of a cathode active material may comprise a layered compound such as lithium cobalt oxide ($LiCoO_2$) and lithium nickel oxide ($LiNiO_2$) or a compound substituted with at least one transition metal; lithium manganese oxides having a chemical formula of $Li_{1+x}Mn_{2-x}O_4$ (where x ranges from 0 to 0.33) such as $LiMnO_3$, $LiMn_2O_3$, and $LiMnO_2$; lithium copper oxides ($Li_2CuO_2$); vanadium oxides such as $LiV_3O_8$, $LiFe_3O_4$, $V_2O_5$, and $Cu_2V_2O_7$; nickel-site type lithium nickel oxides represented by a chemical formula of $LiNi_{1-x}M_xO_2$ (where, M=Co, Mn, Al, Cu, Fe, Mg, B, or Ga, and x=0.01 to 0.3); lithium manganese complex oxides represented by a chemical formula of $LiMn_{2-x}M_xO_2$ (where, M=Co, Ni, Fe, Cr, Zn, or Ta, and x=0.01 to 0.1) or $Li_2Mn_3MO_8$ (where, M=Fe, Co, Ni, Cu, or Zn); lithium manganese complex oxides having a spinel structure represented by a chemical formula of $LiNi_xMn_{2-x}O_4$ (where, x=0.01~0.6); or $LiMn_2O_4$ with a part of lithium being substituted with an alkaline earth metal ion; disulfide compounds; and $Fe_2(MoO_4)_3$, and in one particular example, $LiNi_{0.4}Mn_{1.6}O_4$ may be used.

There is no particular limitation in the amount of the cathode active material to be added and thus the material may be selected depending on the desired characteristics of a battery. For example, the cathode active material can be added in an amount of 80 to 99.5 parts by weight, 85 to 99.5 parts by weight, 90 to 99.5 parts by weight or 95 to 99.5 parts by weight with respect to 100 parts by weight of the above-described cathode active material layer.

The conductive material may be graphite such as natural graphite or artificial graphite; carbon black such as carbon black, acetylene black, ketchen black, channel black, furnace black, lamp black, or summer black; a conductive fiber such carbon fiber or metal fiber; a carbon fluoride powder; a metal powder such as an aluminum powder, or a nickel powder; a conductive whisker such as zinc oxide or potassium titanate; a conductive metal oxide such as titanium oxide; a conductive material such as a polyphenylene derivative, etc.

There is no particular limitation in the content ratio of a conductive material to be added, and thus the content ratio may be determined depending on the characteristics desired of a battery. For example, the conductive material may be added in an amount of 0.1 to 10 parts by weight with respect to 100 parts by weight of the cathode active material layer.

Also, the active material layer comprising an acrylic polymer may further comprise a fluoropolymer which acts as a binder to ensure high dispersion of the components such as a conductive material and an active material and sufficient adhesive strength to a current collector. The fluoropolymer may be comprised in an amount of 0 to 10 parts by weight with respect to 100 parts by weight of the active material layer.

Further, the active material layer may also comprise, as needed, additives well-known in the art.

There is no particular limitation in a thickness of the active material layer, and thus the thickness may be determined so as to achieve intended properties. For example, the active material layer may be formed with a thickness of about 30 μm to 200 μm.

There is no particular limitation in the species of the current collector so long as the material is generally known in the art. Materials for a current collector may be, for example, stainless steel, aluminum, nickel, titanium, sintered carbon, or aluminum and if desired, a surface of the material may have been treated with carbon, nickel, titanium or silver, etc.

The current collector may have, as needed, a surface roughness on the surface which may lead to greater adhesive strength to an active material layer. Should a surface of a current collector of the present application be roughened, the roughening surface treatment may be done by various methods well-known in the art, without particular limitations, such as a mechanical roughening, electro-roughening, chemical roughening, and so on.

The current collector may be used in various forms such as a film, a sheet, a foil, a net, a porous body, foam and nonwoven fabric.

There is no particular limitation in a thickness of the current collector and thus the thickness of the current collector may be adjusted in consideration of other factors such as the mechanical strength of the electrode, productivity and capacity of the battery.

The present application relates to a method of manufacturing a cathode, more particularly, to a method of manufacturing the cathode described above. According to the present application, there is provided a cathode which shows great adhesive strength to a current collector, high resistance to an electrolyte, and high ability to hold and disperse its components such as a conductive material and an active material.

The method may comprise the process of cross-linking an acrylic polymer after the active material layer composition, in which the acrylic polymer is comprised, is applied onto a surface of the current collector. Thus, by cross-linking an acrylic polymer at the drying process of the electrode after the active material layer composition applied onto the surface of the current collector, and it is possible to prepare an active material layer which has excellent physical properties such as great adhesion to the current collector, without requiring an additional operation for cross-linking of the acrylic polymer.

The term "a layer of composition forming active material layer" used in the present application refers to a state in which a layer formed by coating a composition comprising the acrylic polymer is formed and may also refer to such state before the acrylic polymer is cross-slinked by a polyfunctional cross-linker. Also, "an active material layer" used in the present application may refer to a state in which the acrylic polymer comprised in a layer of composition forming active material layer has been cross-linked by the polyfunctional cross-linker and is formed on to the current collector.

The composition forming active material layer may be prepared by blending together the components necessary to forming an active material layer, such as an acrylic polymer and a polyfunctional cross-linker that cross-links the acrylic polymer and may further comprise other components including a conductive material and other active materials for a cathode, and such composition may be prepared in a paste form.

The acrylic polymer comprised in the active material layer may be an acrylic polymer selected from the ones described in the detailed description of the cathode, and may be prepared by a solution polymerization method described herein.

In one example, an acrylic polymer may be prepared by solution polymerization of a mixture including a (meth) acrylic acid ester compound, a monomer having a cross-linkable functional group and a solvent Also, the mixture may further comprise other co-monomers, for example such as a monomer containing a nitrogen-containing functional group and a monomer containing an alkoxysilane group.

The solvent for use in solution polymerization may be any one of organic solvents generally known in the art. In one example, N-methyl pyrrolidone is used as the solvent but is not limited thereto.

The solution polymerization may produce an acrylic polymer whose particle diameter is 10 nm or less. Also, an active material layer which comprises the acrylic polymer produced by this method can have excellent peel strength to a current collector.

There is no particular limitation in the types of the components constituting the active material layer, such as a polyfunctional cross-linker, an active material for a cathode and a conductive material. Accordingly, these components may be selected among the materials disclosed in the detailed description of the cathode.

Compositions of an active material layer may further comprise a solvent. A solvent suitable for use may be selected in consideration of the desired performance, and examples of such solvent may comprise, but are not limited to, organic solvents such as N-methylpyrrolidone, propylene carbonate, ethylene carbonate, butylene carbonate, dimethyl carbonate, diethyl carbonate, γ-butyrolactone, 1,2-dimethoxyethane, tetrahydrofuran, 2-methyl tetrahydrofuran, dimethyl sulfoxide, formamide, dimethyl formamide, acetonitrile, nitromethane, methyl formate, methyl acetate, phosphoric acid triesters, trimethoxy methane, sulfolane, methyl sulfolane, 1,3-dimethyl-2-imidazolidinone, propylene carbonate derivatives, tetrahydrofuran derivatives, methyl propanoate or ethyl propanoate.

There is no particular limitation in the weight ratios of components constituting an active material layer. Accordingly, within a range in light of the weight content mentioned in the detailed descriptions of the cathode, the solvent content may be determined in consideration of characteristics desired of the coating.

There is no particular limitation as to the way a layer of composition forming active material layer is formed onto a current collector, and the coating can be applied by the methods well-known in the art.

According to the method of manufacturing a cathode described in the present application, an active material layer may be formed by performing cross-linking of acrylic polymer when composition forming the active material layer is applying onto a current collector.

The present application does not place any particular limitation on conditions under which cross-linking of an acrylic polymer occurs, for example, the cross-linking may be performed at a temperature which is sufficient for the cross-linking to occur but does not cause the cathode active materials to deteriorate. The cross-linking temperature varies depending on the specific type of a polyfunctional cross-linker and a cross-linkable group involved, and is generally known in the art. For example, the cross-linking may be carried out at a temperature in the range of 50° C. to 300° C., or in the range of 70° C. to 300° C.

For example, the active material layer is formed by coating composition forming active material layer onto the current collector followed by performing cross-linking reaction with additional process such as drying process, if needed.

The present application does not place limitations on the method by which a current collector is coated with a composition forming the active material layer, therefore, any coating method that is known in the art such as a bar coating method, a screen coating method, a doctor blade method, a dip method, a reverse roll method, a direct roll method, a gravure method or an extrusion method may be applied.

The present application does not place any particular limitations in the amount of composition forming the active material layer to be applied onto a current collector, hence, for example, the amount required to form an active material layer of a desired thickness may be determined.

In the present application, operations generally known to be required of manufacturing a cathode, such as roll pressing and drying may be carried out as needed before or after the formation of the active material layer.

The present application further relates to a secondary battery containing the cathode described above, and more particularly to a secondary lithium battery. The present application does not place any particular limitation in structures and other constitutions of the battery, therefore one or more among various constitutions of a secondary battery known in the art may be selected accordingly.

Hereinafter, the present application will be described in more detail with reference to Examples according to the present application and Comparative Examples not corresponding to descriptions in the present application. However, the following Examples are provided only for illustrative purposes and are not intended to limit the scope of the present application. Physical properties provided through Examples and Comparative Examples are evaluated by the methods as follows.

[1. Quantification of Degree of Conversion of Resin]
Analytical Device
Gas chromatography (PerkinElmer, Inc.)
(2) Analytical Conditions
Solvent: Tetrahydrofuran
Initial temperature: 50° C. for 3 minutes, followed by ramping: from 50° C. to 200° C. at a rate of 30° C./min
Injection volume: 0.5 μl
(3) Analytical Procedures
A reactant was dissolved in the solvent to prepare a solution having concentration of 20 mg/mL and then the solution was subjected to gas chromatography. The degree of conversion was measured through calculation of change in the size ratio of a monomer peak to an N-methylpyrrolidone peak.

$$\text{Degree of conversion (\%)} = (A_{ini} - A_{fin})/A_{ini} \times 100$$

Aini: ratio of monomer peak area to N-methylpyrrolidone peak area at initiation of reaction
Afin: ratio of monomer peak area to N-methylpyrrolidone peak area at the end of reaction

[2. Evaluation of Molecular Weight of Resin]
The weight average molecular weight (Mw) and molecular weight distribution (polydispersity index, PDI) were measured through gel permeation chromatography (GPC) under conditions as below, and for the creation of the calibration curve, the standard polystyrene of Agilent system was used to convert the measured results.

<Measurement Conditions>

Meter: Agilent GPC (Agilent 1200 series, United States)
Column: two PL Mixed B connected in series
Column temperature: 40° C.
Eluent: Tetrahydrofuran
Flow rate: 1.0 mL/min
Concentration: approximately 1 mg/mL (100 μl was injected)

[3. Preparation Method of Cathode Paste]

An acrylic polymer solution, a conductive material and an active material were put into a mixing container and stirred at a revolution/rotational speed of 1500 rpm/1500 rpm for 3 minutes. Upon verifying the state of the paste with the naked eye, N-methylpyrrolidone was added a little at a time to the paste, followed by stirring for 1 minute. The addition of N-methylpyrrolidone and subsequent stirring were repeated until the viscosity of the paste became appropriate and ready for coating. At this time, a multifunctional cross-linker was added to the paste and then the paste was again stirred for 1 minute.

[4. Formation of Active Material Layer for Cathode]

A cathode paste was applied with a comma coating machine onto an aluminum foil current collector. Coating speed and a coater slit gap of the coating machine were adjusted appropriately to determine a coating thickness. The coated cathode was dried in an oven of 100° C. to 150° C. for 30 minutes. The cathode was cut into an appropriate size and then roll-pressed repeatedly until desired porosity was obtained. If necessary, the electrode was additionally dried after completion of rolling in a vacuum oven of 100° C. to 150° C. for 12 hours

[5. Evaluation Method of Degree of Weight Loss of Resin after Immersion into Solution]

Approximately 0.5 g of a cured acrylic polymer was placed in a 400 mesh wire mesh and then immersed into a solution of ethyl carbonate/dimethyl carbonate/ethylmethyl carbonate mixed at a volume ratio of 3/4/3. After immersion for 48 hours, the remaining polymer was dried in an oven of 150° C. for 30 minutes and then weighed.

$$\text{Degree of weight loss (\%)}=(\text{weight of polymer before immersion}-\text{weight of polymer after immersion})/(\text{weight of polymer before immersion})\times 100$$

A lower degree of weight loss was interpreted to indicate the polymer's higher resistance to an electrolyte.

[6. Measurement of Gel Content and Calculation of Degree of Weight Loss and Swelling Index]

Ingredients of a specimen containing 1 to 3 parts by weight of a cross-linker with respect to 100 parts by weight of a prepared acrylic polymer were blended together, and the specimen was applied as a 20 μm-thick layer, which was then made into a polymer film by being vacuum-dried in an oven of 130° C. for 1 hour. Then 0.3 g of the film was placed into a 200 mesh stainless steel wire mesh and then immersed into a solution (i.e. an electrolyte) of ethyl carbonate/dimethyl carbonate/ethylmethyl carbonate mixed at a volume ratio of 3/4/3 to swell, and then incubated for 48 hours at room temperature. Subsequently, insoluble portions of the immersed film were collected, dried in an oven of 150° C. for 30 minutes and then weighed. Later, each of the measured weights was substituted into Equation 1 for the calculation of gel content (%).

$$\text{Gel content (\%)}=[(g-m)/a]\times 100 \quad \text{[Equation 1]}$$

g: weight of mesh (g)+weight of specimen (cross-linked; the "insoluble portions") after drying (g)
m: weight of mesh (g)
a: initial weight of specimen (cross-linked+not cross-linked) (g)

Swelling index by an electrolyte was obtained during the course of measuring gel content, by first removing from the solution (i.e. the electrolyte) a 200 mesh stainless steel wire mesh containing a specimen that was previously subjected to swelling, incubating the mesh containing the specimen for approximately 5 minutes at room temperature, wiping off the electrolyte on the outer surface of the mesh, weighing the mesh containing the specimen to calculate the weight ratio of the specimen after swelling with respect to a gel after drying, and substituting the measurements into Equation 2.

$$\text{Swelling index}=(s-m)/(g-m) \quad \text{[Equation 2]}$$

g: weight of mesh (g)+weight of specimen (cross-linked) after swelling and subsequently drying (g)
m: weight of mesh (g)
s: weight of mesh (g)+weight of specimen (cross-linked) after swelling (g)

A higher gel content (%) and lower swelling index were both interpreted to indicate the polymer's higher resistance to an electrolyte.

[7. Method of Measuring Degree of Change in Electrode Thickness]

3 electrode specimens, each of which was containing a 60 μm-thick active material layer and cut into a size of 15×150 mm², were immersed into 200 g of a solution (i.e. an electrolyte) of ethyl carbonate/dimethyl carbonate/ethylmethyl carbonate mixed at a volume ratio of 3/4/3, and then incubated in an oven of 60° C. for 48 hours. Prior to immersion, the thickness of each specimen was measured at 10 different points and then the measurements were averaged. After immersion, the solution on the surface was wiped off lightly with a paper tissue and then the thickness of the specimen was measured immediately. Thicknesses before and after immersion were used to calculate degree of change in electrode thickness.

$$\text{Degree of change in electrode thickness (\%)}=(\text{electrode thickness before immersion}-\text{electrode thickness after immersion})/(\text{electrode thickness before immersion})\times 100$$

A lower degree of change in electrode thickness was interpreted to indicate the polymer's higher resistance to an electrolyte.

[8. Method of Evaluating Peel Strength]

A double-sided adhesive tape was applied onto a glass slide of 26×76×1 mm. Then, a 3M cellophane (single-sided adhesive) tape was applied on top of the double-sided adhesive tape with the adhesive side of the cellophane tape facing upward. An electrode specimen cut into a size of 15×150 mm² was attached to the adhesive side of the cellophane tape and then roll-pressed once with a hand laminator. 3 electrode specimens were prepared for each electrode sample. Peel strength was measured immediately after attaching an electrode specimen to a glass slide, with a Texture analyzer (TA) at a peeling speed of 0.3 m/min and a peeling angle of 180 degrees.

[Resin Preparation Example 1]—Preparation of Acrylic Polymer A1

Preparation Example 1-1. Preparation of Acrylic Polymer A1-1

350 g of a liquid monomer mixture, which was prepared by mixing butyl acrylate (BA), acrylonitrile (AN), and 4-hydroxylbutyl acrylate (HBA) at a weight ratio of 60:30:10, and 150 g of N-methylpyrrolidone (NMP) were put in a 1 L-reaction flask. Then, the reaction flask containing the liquid mixture was sealed with a rubber stopper and then subjected to nitrogen purging and stirring for 30 minutes at 25° C. for the removal of dissolved oxygen. After the temperature of a reaction bath was raised to 70° C., 0.35 g of AIBN (azobisisobutyronitrile) was dissolved in N-methylpyrrolidone to prepare a 10% solution. Oxygen within the solution was removed and the solution was added to the above liquid mixture to initiate the reaction. When conversion of butyl acrylate (BA) was at least 90% complete, the mixture undergoing reaction was exposed to oxygen and subsequently diluted with an appropriate solvent, by which the reaction was terminated and an acrylic polymer A1-1 with a particle diameter of 10 nm or less was prepared.

Preparation Examples 1-2 and 1-3. Preparation of Acrylic Polymers A1-2 and A1-3

Preparation Example 1-1 was repeated with a modification of monomer types and mixing ratios as summarized below in Table 1.

TABLE 1

|         |      | Preparation Example 1-1 (A1-1) | Preparation Example 1-2 (A1-2) | Preparation Example 1-3 (A1-3) | Comparative Preparation Example 1 (B1) |
|---------|------|--------------------------------|--------------------------------|--------------------------------|----------------------------------------|
| Monomer | BA   | 60                             | 30                             | 60                             | 65                                     |
|         | EHA  |                                | 30                             |                                |                                        |
|         | HBA  | 10                             | 10                             |                                |                                        |
|         | HPMA |                                |                                | 10                             |                                        |
|         | AN   | 30                             | 30                             | 30                             | 35                                     |
| Mw      |      | 120,000                        | 150,000                        | 89,000                         | 100,000                                |

BA: Butyl acrylate
EHA: 2-Ethylhexyl acrylate
HBA: 4-Hydroxybutyl acrylate
HPMA: 2-Hydroxypropyl methacrylate
AN: Acrylonitrile

[Resin Preparation Example 2]—Preparation of Acrylic Polymer A2 Having Nitrogen-Containing Functional Group Preparation Example 2-1. Preparation of Acrylic Polymer A2-1 Having Nitrogen-Containing Functional Group A mixture was prepared by mixing butyl acrylate (BA), acrylonitrile (AN), 4-hydroxybutyl acrylate (HBA), and 2-(N,N-dimethylamino)ethyl acrylate (DMAEA) at a weight ratio of 55:30:10:5, to which N-methylpyrrolidone (NMP) was added to adjust solid content to 70%. A reaction flask containing the mixture was sealed with a rubber stopper, subjected to nitrogen purging and stirring for 30 minutes at 25° C., and removed of dissolved oxygen through bubbling. Then, a 10% V-59 (2,2'-azobis-(2-methylbutyronitrile)) solution prepared in N-methylpyrrolidone was degassed to remove oxygen from the solution, and the V-59(1000 ppm vs. monomer weight) solution was added to the above mixture. The reaction flask was placed in a 70° C.-reaction bath to initiate the polymerization. When conversion of butyl acrylate (BA) was at least 90% complete, the mixture undergoing reaction was exposed to oxygen and subsequently diluted with an appropriate solvent, by which the reaction was terminated and an acrylic polymer A2-1 having a nitrogen-containing functional group and a particle diameter of 10 nm or less was prepared.

Preparation Examples 2-2 to 2-4. Preparation of Acrylic Polymers A2-2, A2-3, and A2-4 Having Nitrogen-Containing Functional Group Acrylic polymers A2-2, A2-3, and A2-4 were prepared by repeating Preparation Example 2-1 with a modification of monomer types and mixing ratios as summarized below in Table 2.

TABLE 2

|         |       | Preparation Example 2-1 (A2-1) | Preparation Example 2-2 (A2-2) | Preparation Example 2-3 (A2-3) | Preparation Example 2-4 (A2-4) |
|---------|-------|--------------------------------|--------------------------------|--------------------------------|--------------------------------|
| Monomer | BA    | 55                             | 15                             |                                |                                |
|         | EHA   |                                | 25                             | 55                             | 55                             |
|         | AN    | 30                             | 50                             | 35                             | 35                             |
|         | HBA   | 10                             | 5                              | 10                             | 10                             |
|         | DMAEA | 5                              | 5                              |                                |                                |
|         | DMAA  |                                |                                | 5                              |                                |
|         | NVP   |                                |                                |                                | 5                              |
| Mw      |       | 90,000                         | 120,000                        | 11,000                         | 100,000                        |

BA: Butyl acrylate
EHA: 2-Ethylhexyl acrylate
AN: Acrylonitrile
HBA: 4-Hydroxybutyl acrylate
DMAEA: N,N-Dimethylaminoethyl acrylate
DMAA: N,N-dimethylacrylamide
NVP: N-vinylpyrrolidone

[Resin Preparation Example 3]—Preparation of Acrylic Polymer A3 Having Alkoxysilane Group Preparation Example 3-1. Preparation of Acrylic Polymer A3-1 Having Alkoxysilane Group A mixture was prepared by mixing butyl acrylate (BA), acrylonitrile (AN), 4-hydroxybutyl acrylate (HBA) and 3-acryloxylpropyl trimethoxysilane (AOPTMS) at a weight ratio of 57:35:5:3, to which N-methylpyrrolidone (NMP) was added to adjust solid content to 70%. A reaction flask containing the mixture was sealed with a rubber stopper, subjected to nitrogen purging and stirring for 30 minutes at 25° C., and removed of dissolved oxygen through bubbling. Then, a 10% V-59(2,2'-azobis-(2-methylbutyronitrile)) solution prepared in N-methylpyrrolidone (NMP) was degassed to remove oxygen from the solution, and the V-59 (1000 ppm vs. monomer weight) solution was added to the above mixture. The reaction flask was placed in a 70° C. reaction bath to initiate the polymerization. When conversion of butyl acrylate (BA) was at least 90% complete, the mixture undergoing reaction was exposed to oxygen and subsequently diluted with an appropriate solvent, by which the reaction was terminated and an acrylic polymer A3-1 having an alkoxysilane group and a particle diameter of 10 nm or less was prepared.

Preparation Examples 3-2 and 3-3. Preparation of Acrylic Polymers A3-2 and A3-3 Having Alkoxysilane Group Acrylic polymers A3-2 and A3-3 were prepared by repeating Preparation Example 1 with a modification of monomer types and mixing ratios as summarized below in Table 3.

TABLE 3

|  |  | Preparation Example 3-1 (A3-1) | Preparation Example 3-2 (A3-2) | Preparation Example 3-3 (A3-3) |
|---|---|---|---|---|
| Monomer | BA | 57 | 25 | 60 |
|  | EHA |  | 25 |  |
|  | AN | 35 | 47 | 35 |
|  | HBA |  | 5 |  |
|  | AOPTMS | 3 | 3 | 5 |
| Mw |  | 120,000 | 130,000 | 150,000 |

BA: Butyl acrylate
EHA: 2-Ethylhexyl acrylate
AN: Acrylonitrile
HBA: 4-Hydroxybutyl acrylate
AOPTMS: 3-Acryloxypropyl trimethoxysilane Comparative Resin Examples Comparative Preparation Example 1. Preparation of Acrylic Polymer B1 not Having Functional Group An acrylic polymer B1 not having a cross-linkable functional group was prepared by repeating Example 1 with a modification of monomer types and mixing ratios as summarized above in Table 1.

Comparative Preparation Examples 2 and 3

Additional Comparative Preparation Examples include a solely used PVDF-based binder (B2), and a partially cross-linked, particulate acrylic polymer B3 prepared by emulsion polymerization whose Z-average particle diameter in an intensity distribution is 670 nm.

Example 1

An acrylic polymer A1-1 prepared according to Preparation Example 1-1 was dipped into a solution (i.e. electrolyte) and then a degree of weight loss of the polymer was measured. Also, a paste for a cathode, which contains 1.9 parts by weight of an acrylic polymer A1-1, 2 parts by weight of a conductive material, 96 parts by weight of an active material, and 0.1 parts by weight of a cross-linker with respect to 100 parts by weight of the total paste, was applied onto a current collector to prepare an electrode, and then peel strength and degree of change in electrode thickness were measured. The degree of weight loss of the acrylic polymer (i.e. resin) A1-1, the peel strength of the active material layer to the current collector in the electrode, and the degree of change in electrode thickness are summarized below in Table 4.

Examples 2 to 8

An electrode was prepared as illustrated in Example 1, except that a paste for the cathode was prepared to contain a resin having one or more of the acrylic polymers A1-1, A1-2 and A1-3, which were prepared according to Examples 1-1 to 1-3, wherein the acrylic polymers were contained in the paste either exclusively or in combination with a polyvinylidene difluoride (PVDF) binder. The above paste also contained a cross-linker, a conductive material, and an active material mixed according to the weight ratio summarized below in Table 4. Degree of weight loss of each acrylic polymer (i.e. resin), peel strength of each active material layer to the corresponding current collector in the electrode, and degree of change in electrode thickness are summarized below in Table 4.

TABLE 4

|  | Example 1 | Example 2 | Example 3 | Example 4 | Example 5 | Example 6 | Example 7 | Example 8 |
|---|---|---|---|---|---|---|---|---|
| Resin (parts by weight) | A1-1 (1.9) | A1-2 (2) | A1-3 (2) | A1-1 (0.95) PVDF (1.5) | A1-1 (0.45) PVDF (1.5) | A1-1 (2.85) | A1-1 (1.43) PVDF (1.5) | A1-2 (1.43) PVDF (1.5) |
| Cross-linker (parts by weight) | TDI-based (0.1) | TDI-based (0.1) | TDI-based (0.1) | TDI-based (0.05) | TDI-based (0.05) | TDI-based (0.15) | TDI-based (0.07) | TDI-based (0.07) |
| Conductive material (parts by weight) | Denka black (2) | Denka black (2) | Denka black (2) | Denka black (2) | Denka black (2) | Denka black (3) | Denka black (3) | Denka black (3) |
| Active material (parts by weight) | LCO type (96) | LCO type (96) | LCO type (96) | LCO type (96) | LCO type (96) | LCO type (94) | LCO type (94) | LCO type (94) |
| Degree of weight loss of resin | 16% | 17% | 17% | 3% | <1% | — | — | — |
| Electrode peel strength (gf) | 240 | 170 | 210 | 130 | 90 | 260 | 160 | 130 |
| Degree of change in electrode thickness | <1% | <1% | <1% | <1% | <1% | <1% | <1% | <1% |

TDI-based cross-linker: Toluene diisocyanate/trimethylolpropane adduct
PVDF: a polyvinylidene difluoride (PVDF) binder

Example 9

A liquid mixture was prepared according to Preparation Example 2-1 by mixing 0.29 parts by weight of an acrylic polymer resin A1 having a nitrogen-containing functional group, 94 parts by weight of an active material (Li(NiMnCo)O$_2$ type active material, 3 parts by weight of a conductive material (acetylene black (Denka black)), 2.7 parts by weight of a fluorine-based binder (polyvinylidene difluoride, PVDF), and 0.01 parts by weight of a diisocyanate-based cross-linker (TDI). Then, N-methylpyrrolidone (NMP) was added to the liquid mixture to adjust solid content to 76% to form composition forming an active material layer, which was then applied onto an aluminum foil for preparation of a cathode for a secondary battery. Peel strength of an active material layer to the current collector and degree of change in electrode thickness are summarized below in Table 5, wherein the active material layer was prepared according to Example 9 for a cathode of a secondary battery.

Examples 10 to 16

Each cathode for a secondary battery was prepared by repeating Example 9 with the exception that the acrylic polymer was selected among the acrylic polymer resins A2-1, A2-2, A2-3 and A2-4, each of which has a nitrogen-containing functional group and was prepared according to one of Preparation Examples 2-1 to 2-4, and that the polymer was used in composition forming an active material layer along with a cross-linker, a conductive material, a fluorine-based polymer and an active material mixed at a corresponding weight ratio summarized below in Table 5. Peel strength of each active material layer to a corresponding current collector and degree of change in electrode thickness are summarized below in Table 5, wherein the active material layer was prepared according to one of Examples 10 to 16 for a cathode of a secondary battery.

Example 17

A liquid mixture was prepared according to Preparation Example 3-1 through mixing of 0.297 parts by weight of acrylic polymer resin A3-1 having an alkoxysilane group, 94 parts by weight of an active material (Li(NiMnCo)O$_2$ type active material, 3 parts by weight of a conductive material (acetylene black (Denka black)), 2.7 parts by weight of a fluorine-based binder (polyvinylidene difluoride, PVDF), 0.0019 parts by weight of a diisocyanate-based cross-linker (TDI), and 0.0011 parts by weight of an alkoxysilane-based cross-linker (TMS). Then, N-methylpyrrolidone (NMP) was added to the liquid mixture to adjust solid content to 76% to form composition forming an active material layer, which was then applied onto an aluminum foil to prepare a cathode for a secondary battery. Peel strength of an active material layer to the current collector and degree of change in electrode thickness are summarized below in Table 6, wherein the active material layer was prepared according to Example 17 for a cathode of a secondary battery.

Examples 18 to 23

Each cathode for a secondary battery was prepared by repeating Example 9 with the exception that an acrylic polymer resin was selected among acrylic polymer resins A3-1, A3-2 and A3-3, each of which has an alkoxysilane group and was prepared according to one of Preparation Examples 3-1 to 3-3, and that the acrylic polymer resin was used in composition forming an active material layer along with a cross-linker, a conductive material, a fluorine-based polymer and an active material mixed at a corresponding weight ratio summarized below in Table 6. Peel strength of each active material layer to a corresponding current collector and degree of change in electrode thickness are summarized below in Table 6, wherein the active material layer was prepared according to one of Examples 18 to 23 for a cathode of a secondary battery.

TABLE 5

|  | Example 9 | Example 10 | Example 11 | Example 12 | Example 13 | Example 14 | Example 15 | Example 16 |
|---|---|---|---|---|---|---|---|---|
| Active material (parts by weight) | 94 | 94 | 94 | 94 | 96 | 96 | 96 | 96 |
| Conductive material (parts by weight) | 3 | 3 | 3 | 3 | 2 | 2 | 2 | 2 |
| PVDF | 2.7 | 1.5 | 1.5 | 1.5 | 1 | 1.8 | 1 | 1 |
| Acrylic polymer (parts by weight) | A2-1 (0.29) | A2-1 (1.46) | A2-2 (1.495) | A2-3 (1.46) | A2-1 (0.97) | A2-2 (0.19) | A2-3 (0.97) | A2-4 (0.97) |
| Cross-linker (parts by weight) | TDI (0.01) | TDI (0.04) | TDI (0.04) | TDI (0.04) | TDI (0.03) | TDI (0.01) | TDI (0.03) | TDI (0.03) |
| Electrode peel strength (gf) | 80 | 180 | 190 | 200 | 190 | 100 | 150 | 100 |
| Degree of change in electrode thickness | <1% | <1% | <1% | <1% | <1% | <1% | <1% | <1% |

TABLE 6

|  | Example 17 | Example 18 | Example 19 | Example 20 | Example 21 | Example 22 | Example 23 |
|---|---|---|---|---|---|---|---|
| Active material (parts by weight) | 94 | 94 | 94 | 94 | 96 | 96 | 96 |
| Conductive material (parts by weight) | 3 | 3 | 3 | 3 | 2 | 2 | 2 |
| PVDF | 2.7 | 1.5 | 1.5 | 1.5 | 1 | 1 | 1.8 |
| Acrylic polymer (parts by weight) | A3-1 (0.297) | A3-1 (1.495) | A3-2 (1.495) | A3-3 (1.495) | A3-1 (0.99) | A3-2 (0.99) | A3-3 (0.198) |
| Cross-linker (parts by weight) | TDI (0.0019) and TMS (0.0011) | TDI (0.003) and TMS (0.002) | TMS (0.005) | TMS (0.005) | TDI (0.006) and TMS (0.004) | TMS (0.01) | TMS (0.002) |
| Electrode peel strength (gf) | 90 | 170 | 160 | 205 | 160 | 150 | 90 |
| Degree of change in electrode thickness | <1% | <1% | <1% | <1% | <1% | <1% | <1% |

Comparative Examples 1 to 5

Each electrode for a secondary battery was prepared by repeating Example 1 with the exception of the acrylic polymer B1, which does not have a cross-linkable group and was prepared according to Comparative Examples 1 to 3 above, a polyvinylidene difluoride (PVDF) binder B2 and a 670 nm-diameter, particulate acrylic polymer B3 were used either exclusively or in combination, and that a paste for cathode was prepared to contain a conductive material and an active material mixed at a weight ratio summarized below in Table 7. Degree of weight loss, and peel strength of each active material layer to a current collector, and degree of change in electrode thickness are summarized below in Table 7.

TABLE 7

|  | Comparative Example 1 | Comparative Example 2 | Comparative Example 3 | Comparative Example 4 | Comparative Example 5 |
|---|---|---|---|---|---|
| Resin (parts by weight) | B1(2) | B2(2) | B3(2) | B2(3) | B2(1.5), B3(1.5) |
| Cross-linker (not used) | — | — | — | — | — |
| Conductive material (parts by weight) | Denka black(2) | Denka black(2) | Denka black(2) | Denka black(3) | Denka black(3) |
| Active material (parts by weight) | LCD type (96) | LCO type (96) | LCO type (96) | LCO type (94) | LCO type (94) |
| Degree of weight loss of resin | >98% | <1% | 22% | — | 4% |
| Electrode peel strength (gf) | 120 | 10 | 20 | 20 | 20 |
| Degree of change in electrode thickness | Electrode delamination | <1% | 1~2% | <1% | <1% |

B1: acrylic polymer not having cross-linkable group as in [Table 1]
B2: PVDF
B3: 670 nm-diameter, particulate acrylic polymer As discussed in Tables 2 and 7, the acrylate polymers each having a cross-linkable group and were prepared by solution polymerization according to Examples above exhibit low degrees of weight loss at or below 20%, and the resin B1 not having a cross-linkable group degraded in an electrolyte solution most of the time and thus was evaluated not to have resistance to an electrolyte. Changes in electrode thickness were measured to additionally confirm if the above (low) degrees of weight loss would lead to (high) resistance of prepared electrode to the electrolyte, and it was found that the active material layers of the electrodes were still remaining with their electrode thicknesses unchanged as the result is summarized in Tables 2 and 7.

Also as discussed in Tables 2 and 7, greater electrode peel strength was achieved when one of acrylic polymers A1, A2 and A3 in Examples was used as a binder either exclusively or in combination with a polyvinylidene difluoride (PVDF) binder B2, compared to when either a polyvinylidene difluoride B2 or an emulsion-polymerized, particulate acrylic polymer B3 was used exclusively. Compared to a polyvinylidene difluoride B2 or an emulsion-polymerized, particulate acrylic polymer B3, an acrylic binder B1 not having a cross-linkable group resulted in greater peel strength, which was, however, lower than the peel strength of the acrylic polymers A1, A2 and A3, each having a cross-linkable group.

In addition, gel contents (%) and swelling indices of acrylic polymers A2 and A3, each comprising a monomer polymerization unit having a nitrogen-containing functional group or further containing a monomer polymerization unit having an alkoxysilane group, were evaluated and are summarized in Tables 8 and 9 below. As described in Tables 8 and 9 below, each of acrylic polymers A2-1, A2-2, A2-3 and A2-4 including a monomer polymerization unit having a nitrogen-containing functional group and each of acrylic polymers A3-1, A3-2, and A3-3 including a monomer polymerization unit having an alkoxysilane group had gel contents (%) of 80% or more and low swelling indices ranging from 1.0 to 10, by which the polymer's excellent resistance to an electrolyte was indicated.

TABLE 8

| | Preparation Example 2-1 (A2-1) | Preparation Example 2-2 (A2-2) | Preparation Example 2-3 (A2-3) | Preparation Example 2-4 (A2-4) |
|---|---|---|---|---|
| Cross-linker (wt %) | TDI(3) | TDI(3) | TDI(3) | TDI(3) |
| Gel content (%) | 86 | 90 | 82 | 84 |
| Swelling index | 1.2 | 1.1 | 1.3 | 1.2 |

TDI: toluenediisocyanate/trimethylolpropane adduct
TMS: 3-aminopropyl trimethoxysilane

TABLE 9

| | Preparation Example 3-1 (A3-1) | Preparation Example 3-2 (A3-2) | Preparation Example 3-3 (A3-3) |
|---|---|---|---|
| Cross-linker (wt %) | TDI(0.625), TMS(0.375) | TMS(1) | TMS(1) |
| Gel content (%) | 95 | 91 | 96 |
| Swelling index | 1.1 | 1.2 | 1.0 |

TDI: toluenediisocyanate/trimethylolpropane adduct
TMS: 3-aminopropyl trimethoxysilane

What is claimed is:

1. A cathode for a secondary battery, comprising:
a current collector; and
an active material layer present on the current collector and comprising an acrylic polymer which forms a cross-linked structure with a polyfunctional cross-linker,
wherein the acrylic polymer comprises a polymerization unit of a (meth)acrylic acid ester compound, a polymerization unit of a monomer containing a cross-linkable functional group, and a polymerization unit of a vinyl-based monomer except for a (meth)acrylic acid ester compound, and
wherein the cross-linkable functional group comprises a hydroxyl group,
wherein the polyfunctional cross-linker is a polyfunctional compound comprising two or more functional groups that contain an isocyanate group,
wherein the polyfunctional compound is an aromatic polyisocyanate,
wherein the polymerization unit of a vinyl-based monomer except for a (meth)acrylic acid ester compound is acrylonitrile,
wherein the acrylic polymer is comprised in the active material layer at a ratio of 0.01 to 10 parts by weight with respect to 100 parts by weight of the active material layer, and
wherein a peel strength of the active material layer to the current collector is 20 gf or greater when measured at a peeling speed of 0.3 m/min and a peeling angle of 180 degrees at room temperature with an electrode specimen sized 15×150 mm$^2$.

2. The cathode of claim 1, wherein the (meth)acrylic acid ester compound is an alkyl (meth)acrylate.

3. The cathode of claim 1, wherein the acrylic polymer further comprises a polymerization unit of a monomer containing a nitrogen-containing functional group, or a polymerization unit of a monomer containing an alkoxysilane group.

4. The cathode of claim 3, wherein the acrylic polymer comprises a gel content of 80% to 100%.

5. The cathode of claim 1, wherein the active material layer further comprises a fluorine-based polymer.

6. The cathode of claim 1, wherein the active material layer further comprises a cathode active material.

7. The cathode of claim 6, wherein the cathode active material is comprised in the active material layer at a ratio of 80 to 99.5 parts by weight with respect to 100 parts by weight of the active material layer.

8. The cathode of claim 1, wherein the active material layer further comprises a conductive material.

9. The cathode of claim 1, wherein the current collector comprises aluminum.

10. A method of manufacturing the cathode for a secondary battery of claim 1, the method comprising cross-linking of an acrylic polymer in a state in which a layer of composition forming an active material layer comprising the acrylic polymer is previously formed on a current collector.

11. The method of claim 10, wherein the acrylic polymer is cross-linked in the range of 50 to 300° C.

12. The method of claim 10, wherein the acrylic polymer is prepared through solution polymerization using a mixture which comprises a (meth)acrylic acid ester compound, a monomer containing a cross-linkable functional group and a solvent, and a vinyl-based monomer except for the (meth)acrylic acid ester compound.

13. The method of claim 12, wherein the mixture further comprises a monomer containing a nitrogen-containing functional group or a monomer containing an alkoxysilane group.

14. A secondary battery comprising the cathode of claim 1.

* * * * *